(12) United States Patent
Taffin et al.

(10) Patent No.: US 7,272,191 B2
(45) Date of Patent: Sep. 18, 2007

(54) METHOD AND APPARATUS FOR PRODUCING AND PROCESSING SEQUENCES OF MODULATION SYMBOLS

(75) Inventors: Arnauld Taffin, Paris (FR); Bastien Massie, Paris (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 645 days.

(21) Appl. No.: 10/180,853

(22) Filed: Jun. 26, 2002

(65) Prior Publication Data

US 2004/0001555 A1    Jan. 1, 2004

(51) Int. Cl.
*H04L 5/12*    (2006.01)
(52) U.S. Cl. ..................................... 375/261
(58) Field of Classification Search ............... 375/261, 375/260, 259, 295, 298, 300, 377, 316; 341/50, 341/52; 332/103, 149; 370/333, 332, 331, 370/329, 328, 310, 218, 217, 216
See application file for complete search history.

(56) References Cited

U.S. PATENT DOCUMENTS 6,351,832 B1 *    2/2002    Wei .......................... 714/701

FOREIGN PATENT DOCUMENTS

EP         1191699      *    3/2002

OTHER PUBLICATIONS

"Bandwidth-Efficient Turbo Trellis-Coded Modulation Using Punctured Component Codes", "IEEE Journal on Selected Areas in Communications", vol. 16. No. 2, Feb. 1998, Patrick Robertson and Thomas Worz.*
3GPP TSG RAN TR 25.858, version 0.2.0 (Nov. 2001), Release 5, "High Speed Downlink Packet Access: Physical Layer Aspects".
Tdoc 12A010044, Samsung, "Enhanced Symbol Mapping method for the modulation of turbo coded bits based on bit priority", 3GPP TSG RAN WG1/WG2 joint meeting on HSDPA, Sophia Antipolis, France, Apr. 2001.
TSGR1#20(01)0533, Samsung, "Performance Evaluation of the enhanced Symbol Mapping method based on Priority (SMP) in HSDPA", 3GPP TSG RAN1 Meeting #20, Busan, Korea, May 2001.
TSGR1#19(01)0237, Panasonic, "Enhanced HARQ Method with Signal Constellation Rearrangement", 3GPP TSG RAN1 meeting # 19, Las Vegas, USA, Feb. 2001.

(Continued)

*Primary Examiner*—Pankaj Kumar
(74) *Attorney, Agent, or Firm*—Trop, Pruner & Hu, P.C.

(57) ABSTRACT

A sequence of modulation symbols defines at least two bit groups, including a first group of bits located in at least one first bit position within the symbols and a second group of bits located in at least one second bit position within the symbols and having a higher probability of transmission error than the bits of the first group. The coded information bits of a block are arranged to form a first sequence of bits in which each information bit is assigned to a respective one of the bit groups. The bits of the first sequence are then interleaved to form a second sequence of bits while preserving the assignment of the information bits to the bit groups. The bits of the second sequence are finally mapped onto the sequence of modulation symbols.

35 Claims, 5 Drawing Sheets

OTHER PUBLICATIONS

TSGR1#21(01)0848, Texas Instrument, "Hybrid ARQ based on bit-level combining and the short block random interleaving", 3GPP TSG RAN1 meeting # 21, Turin, Italy, Aug. 2001.

TSGR1(01)0713, Panasonic, " Bit Separation for MCS Selection and Multipath Interference Cancellation for HSDPA", 3GPP TSG RAN1 Ad Hoc meeting on Release 5, Espoo, Finland, Jun. 2001.

TSGR1#22(01)1225, Nokia, "Constellation rearrangment considerations for HSDPA retransmissions", 3GPP TSG RAN1 meeting # 22, Jeju, Korea, Nov. 2001.

TSGR#22(01)1143, Mitsubishi Electric, "Proposal of Interleave structure of HSDPA", 3GPP TSG RAN1 meeting # 22, Jeju, Korea, Nov. 2001.

J. Yuan, W. Feng and B. Vucetic, "Turbo Trellis Coded Modulation for Fading Channels", in Proc. of IEEE VTC Spring 2000, Tokyo, Japan.

J. Yuan, B. Vucetic and W. Feng, "Turbo Coded M-QAM for Fading Channels", IEE Electronics Letters, Aug. 31, 2000, vol. 36, No. 18.

3GPP TS 25.212, "Multiplexing and channel coding (FDD)", Release 1999, v3.7.0 (Sep. 2001).

IEEE 1993, Berrou et al. "Near Shannon Limit Error—Correcting Coding and Decoding: Turbo-Codes(1)".

3GPP T25.855, version 5.0.0 (Sep. 2001), Release 5, "High Speed Downlink Packet Access".

* cited by examiner

METHOD AND APPARATUS FOR PRODUCING AND PROCESSING SEQUENCES OF MODULATION SYMBOLS

BACKGROUND OF THE INVENTION

The present invention relates to the field of digital communications.

More particularly, it relates to the conditioning of a sequence of modulation symbols for a modulation scheme which provides different bits constituting a modulation symbol with different levels of bit error probability.

An important class of such modulation schemes is made of quadrature amplitude modulations (QAM). These modulation schemes have become popular because of their performance in terms of bandwidth. Most often, they accept input symbols consisting of n bits, with n integer, i.e. the symbols may have $N=2^n$ states. Such modulation of N-ary symbols is referred to as N-QAM.

In the following, 16-QAM will be more particularly considered (n=4). However, it will be appreciated that the discussion is also applicable to any N-QAM scheme.

In certain systems, a QAM modulator is associated with an encoder which delivers bits of different importance for the receiver.

For example, such coder may be a systematic error correction coder making use of turbocodes (see C. Berrou et al., "Near Shannon Limit Error-Correcting Coding and Decoding: Turbo Codes", Proc. of IEEE ICC'93, Geneva, Switzerland, May 1993, pp. 1064-1070). A turbocoder delivers on the one hand systematic bits and on the other hand parity bits, and it is well known that the systematic bits have a higher importance than the parity bits for the receiver's ability to correct transmission errors.

In "Turbo Trellis Coded Modulation for Fading Channels" (Proc. of IEEE VTC Spring'00, June 2000, Tokyo, Japan, pp. 2059-2063), J. Yuan et al. propose to map the bit output of a turbocoder onto the N-ary input symbols of a N-QAM modulator. The authors suggest that the systematic bits output by the turbocoder should be mapped to the bit positions having the lowest probability of transmission error within the N-ary symbols, while the parity bits are mapped to the bit positions of higher transmission error probability.

Such an association of a turbocoder and a QAM modulator has been proposed for the transmission chain used in the HSDPA service in UTRAN networks. HSDPA is an acronym for "High Speed Downlink Packet Access". UTRAN is an acronym for "UMTS Terrestrial Radio Access Network". UMTS ("Universal Mobile Telecommunication System") is a third generation cellular radio communication system which is being standardized by the $3^{rd}$ Generation Partnership Project (3GPP).

The UMTS HSDPA service makes use of so-called HS-DSCH channels ("High Speed-Downlink Shared Channels") in which the user data are encoded by means of a rate ⅓ turbocode. The modulation is 16-QAM.

However, a problem encountered in this system is that some operations are carried out between the output of the turbocoder and the input of the QAM modulator. These operations include a variable rate puncturing, or rate matching, followed by an interleaving. The rate matching is coupled with a hybrid ARQ ("Automatic Repeat reQuest") mechanism with incremental redundancy (IR). Accordingly, the processing required at the output of the interleaver to map the systematic and parity bits onto the relevant bit positions of the QAM symbols is very complicated since a very large number of variable puncturing and incremental redundancy configurations have to be taken into account downstream of the shuffling caused by the interleaver.

An object of the present invention is to overcome these difficulties by providing an improved method of constructing a sequence of modulation symbols, which is relatively easy to implement, even for blocks of coded information bits having various structures.

SUMMARY OF THE INVENTION

The invention proposes a method of producing at least one sequence of modulation symbols for transmission, each modulation symbol consisting of a predefined number of bits. The at least one sequence of modulation symbols defines at least two bit groups, including a first group of bits located in at least one first bit position within the symbols and a second group of bits located in at least one second bit position within the symbols and having a higher probability of transmission error than the bits of the first group.

The proposed method comprises the steps of:

providing at least one block of coded information bits to be transmitted;

arranging the coded information bits of said block to form at least one first sequence of bits in which each information bit is assigned to a respective one of said bit groups;

interleaving the bits of each first sequence to form a respective second sequence of bits while preserving the assignment of the information bits to said bit groups; and mapping each second sequence of bits onto a respective sequence of modulation symbols.

Once the coded information bits have been assigned to a bit group in order to protect them more or less against transmission error, the assignment to the groups is preserved up to the modulation stage.

The information bit arrangement can take into account the coding of the block in order to promote the assignment of bits to one of the groups of bits according to the relative importance of their contents. In a preferred embodiment, systematic bits output by a channel coder are assigned preferentially to the most protected group(s) of bits, whereas parity check bits are assigned preferentially to the least protected group(s).

This can be performed for any proportion of parity check bits compared to systematic bits. This is very advantageous because it allows a conversion of blocks of information bits with various types of coding and/or code puncturing or repetition rates, while keeping a single type of interleaving scheme downstream of the rate matching unit.

Another aspect of the invention relates to an apparatus for producing at least one sequence of modulation symbols for transmission, each modulation symbol consisting of a predefined number of bits, wherein the at least one sequence of modulation symbols defines at least two bit groups, including a first group of bits located in at least one first bit position within the symbols and a second group of bits located in at least one second bit position within the symbols and having a higher probability of transmission error than the bits of the first group. This apparatus comprises:

means for providing at least one block of coded information bits to be transmitted;

means for arranging the coded information bits of said block to form at least one first sequence of bits in which each information bit is assigned to a respective one of said bit groups;

means for interleaving the bits of each first sequence to form a respective second sequence of bits while preserving the assignment of the information bits to said bit groups; and means for mapping each second sequence of bits onto a respective sequence of modulation symbols.

At the receiver end, the invention further provides an apparatus for processing at least one sequence of estimated modulation symbols received along a communication channel, each modulation symbol consisting of a predefined number of bits, wherein the at least one sequence of modulation symbols defines at least two bit groups, including a first group of estimated bits located in at least one first bit position within the symbols and a second group of estimated bits located in at least one second bit position within the symbols and having a higher probability of reception error than the estimated bits of the first group. This apparatus comprises:

means for mapping each sequence of estimated modulation symbols onto a respective first sequence of estimated bits;
means for de-interleaving the estimated bits of each first sequence to form a respective second sequence of bits while preserving the assignment of the estimated bits to said bit groups;
means for arranging the estimated bits of the at least one second sequence into a block of estimated bits; and
means for evaluating a block of information bits by means of the block of estimated bits.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

The invention is illustrated here in its currently preferred application to a UMTS system supporting the HSDPA service.

Figure 1:
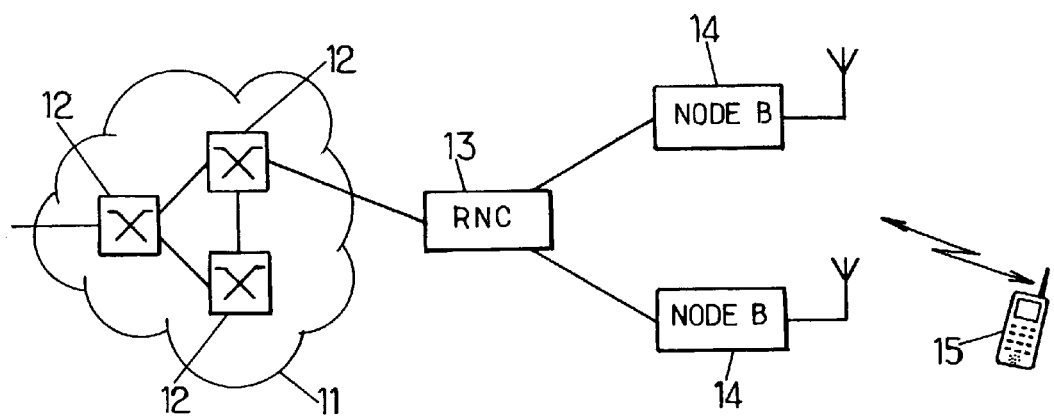
FIG. 1 is a schematic view of a system implementing the invention.

FIG. 1 is a schematic representation of a UMTS network for implementing the invention. A core network 11 contains a mesh of switches 12 for routing traffic such as data, voice, signaling, etc. The core network 11 is typically-interconnected with other networks such as a packet data network, the Internet for example, or a public switched telephone network.

The UMTS system further includes a radio access network including radio network controllers (RNCs) 13 and base transceiver stations 14 referred as "nodes B". A RNC 13 links the core network 11 with the base stations 14. It is also responsible for advanced functions like controlling of communications or managing mobility for instance. The nodes B 14, each dependent on a RNC 13 have radio transmission capacities and can communicate with mobile stations 15 called UE ("User Equipment").

The illustrated UMTS system supports the HSDPA functionality. The base station can transmit high speed traffic and associated signaling to the mobile station 15 according to the relevant HSDPA protocols. The UE 15 can receive such traffic and also send HSDPA signaling to the base station.

An overall description of HSDPA is provided in the Technical Report 3GPP TR 25.855, V5.0.0, Release 5, "High Speed Downlink Packet Access; Overall UTRAN Description", published in September 2001 by the 3GPP, which report is incorporated herein by reference.

It permits high speed data transmission from a base station to a plurality of mobile stations. It uses a shared transport channel called HS-DSCH. In a FDD ("Frequency Division Duplex") mode, such channel has the following features:

(i) a transmission time interval (TTI) of two milliseconds corresponding to 3 timeslots of 666 µs each;
(ii) a hybrid ARQ (HARQ) retransmission process with incremental redundancy (IR);
(iii) an adaptive coding and modulation mechanism.

A specific medium access control layer (MAC) is present in the base station. This is for getting a maximum throughput on this channel. For the same reason, HS-DSCH uses a spreading factor relatively low, equal to 16. In a given cell and for a given scrambling code, 15 HS-DSCH channels can be established, using orthogonal channelization codes.

A transmission chain supporting the HSDPA service can use two modulations for its HS-DSCH channels: quadrature phase shift keying (QPSK) and 16-QAM.

The invention is more specifically described hereafter in connection with 16-QAM, but it can be implemented for any other modulation especially quadrature amplitude modulation. In 16-QAM, each modulation symbol is composed of n=4 bits and can have $N=2^4=16$ different states. It is characterized by a specific symbol position in a complex plane corresponding to the phase and amplitude of the transmitted signal as is well known in the art.

Figure 2:
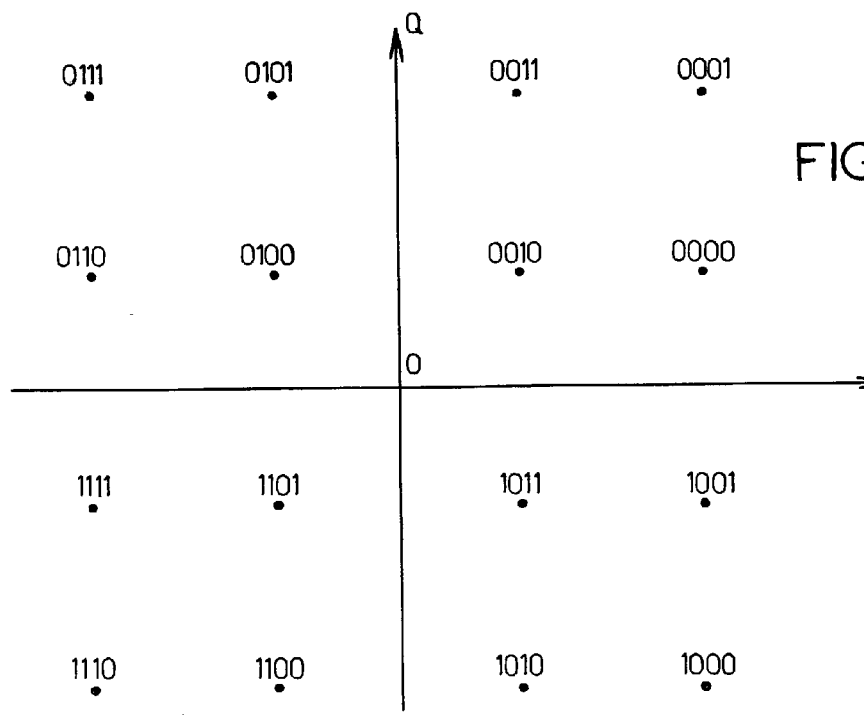
FIG. 2 is a diagram of an example of 16-QAM symbol constellation.

As shown in the example of FIG. 2, the distribution of each of the 16 states for a 16-QAM symbol is done in such a way that the half-planes are determined by one of the two first bits of a four-bit symbol. For instance, the upper half-plane, i.e. the half-plane where the imaginary part Q is positive, contains symbols with the first bit put to 0, whereas the lower half-plane contains symbols with the first bit put to 1. Besides, all the symbols have their second bit put to 0 on the right hand-side of FIG. 2, i.e. the half-plane where the real part I is positive, whereas it is put to 1 on the left hand-side. Accordingly the first two bits are most significant bits (MSB) whose values are relatively easily discriminated by the demodulator in the presence of channel noise: the decision can be made simply on the basis of the sign of the real and imaginary parts of the received complex baseband signal. However, such rules do not address the other two bits contained in the 16-QAM symbols which are hence more sensitive to noise. These two other bits are referred to as least significant bits (LSBs) because they are less robust than the MSBs. In other words, the two MSBs of each symbol have a lower probability of transmission error than the two LSBs.

Similar considerations apply to any QAM modulation scheme.

Figure 3:
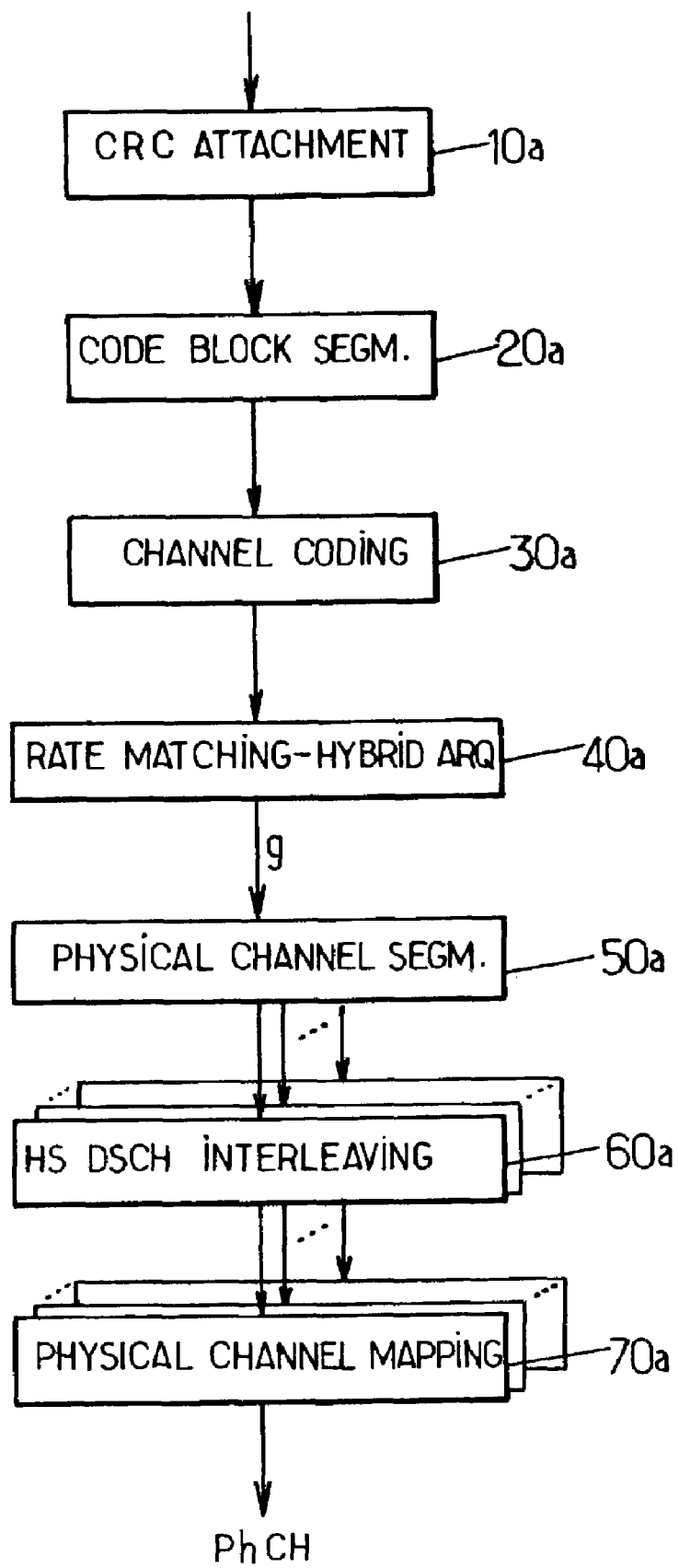
FIG. 3 is a block diagram of an exemplary transmission chain implementing the invention.

In the operations performed by the base station 14 for constructing a sequence of 16-QAM symbols, different main functions must be implemented as shown in FIG. 3.

The HS-DSCH conveys successive transport blocks received from the RNC 13. A cyclic redundancy checksum (CRC) is first attach by a module 10a to help detecting transmission errors at the UE. The CRC attachment is done in the same way as for the other transport blocks, for instance in the dedicated channels (DCH), as described in the technical specification TS 25.212, V4.2.0 "Multiplexing and Channel Coding (FDD)", Release 4, published by the 3GPP in September 2001.

A segmentation module 20a performs segmentation of the transport block with the attached CRC if its size is above a number of bits, which is set to 5114. This is also done in a conventional way as for the other transport channels.

A channel coder 30a encodes each block of $N_c \leq 5114$ bits by means of a rate ⅓ turbocode. The detailed structure of the turbocoder 30a is disclosed in the aforesaid specification TS 25.212. The turbocoder output includes systematic bits (S), i.e. bits simply copied from the input block, and two parity check bits ($P_1$ and $P_2$) for each systematic bit, produced by the constituent codes of the turbocode.

Figure 4:
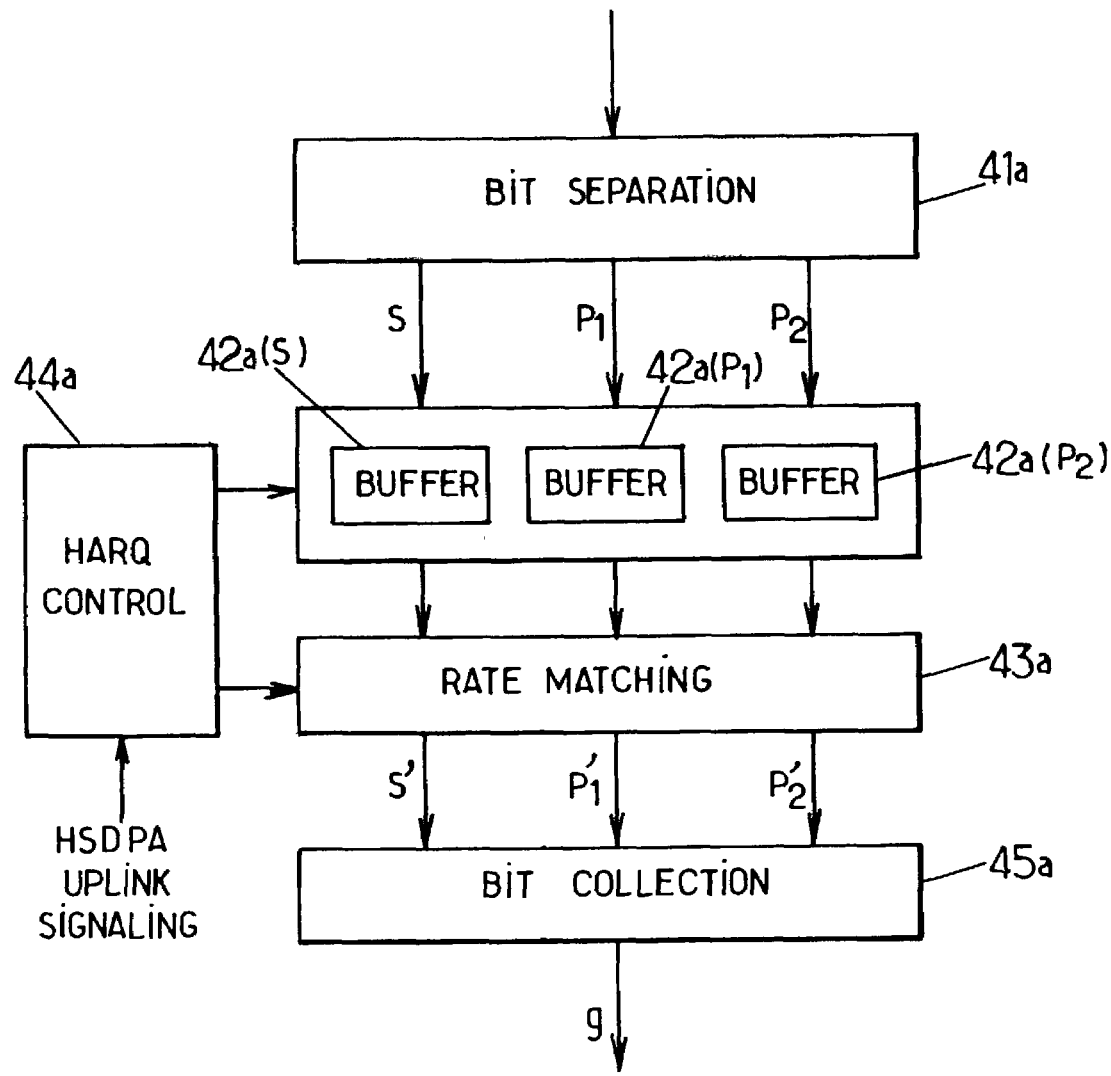
FIG. 4 is a more detailed diagram showing the operations performed in one of the modules shown in FIG. 3.

The following module 40a is configured to execute a series of steps as shown in FIG. 4. The block of coded information bits is split in step 41a so as to separate the S, $P_1$ and $P_2$ bits written into respective buffers 42a(S), 42a($P_1$) and 42a($P_2$). A rate matching operation 44a is applied to a block of separated bits selected by a controller 44a. Rate matching is most often a puncturing of a variable number of the coded bits according to a certain puncturing pattern selected by the controller 44a. Because of their lower importance for the channel decoder, parity check bits are preferably punctured in priority, as compared with the systematic bits. In certain cases, puncturing may be replaced by repetition, whereby the repeated bits are preferably systematic bits.

The variable rate puncturing (or repetition) is performed in exactly the same manner as for the other transport channels, as described in the above-mentioned specification TS 25.212.

Another functionality of module 40a is HARQ. This functionality is responsible for retransmission of some of blocks that have not been acknowledged by the mobile station or have been acknowledged negatively. The unacknowledged blocks can thus be simply repeated by the base station. In the preferred IR case, the block is repeated by applying a puncturing or repetition pattern different form the one used in the first transmission. Choosing different bit positions for the puncturing or repetition operation enriches the input of the channel decoder, and may thus help to achieve the block recovery if the first reception has been buffered. If necessary, third, fourth, etc. transmissions of the same block may be effected. The HARQ controller 44a (FIG. 4) processes the HSDPA uplink signaling information received from the UE, indicating which blocks have and have not been correctly received to carry out the following operations:

managing buffers 42a(S), 42a($P_1$) and 42a($P_2$) to delete the acknowledged blocks and to determine which block is to be transmitted next (scheduling);

selecting the IR puncturing or repetition pattern to be applied to the scheduled block by the rate matching unit 43a.

The output of rate matching unit 43a includes systematic bits S', and parity check bits $P'_1$ and $P'_2$ corresponding respectively to the $P_1$ and $P_2$ bits, in a proportion that depends on the rate matching pattern. These bits are arranged into a sequence g by a bit collection unit 45a.

The bit collection unit 45a maps the bits provided every 2 ms by the rate matching unit 43a in respect of a block onto a bit sequence g. This sequence g consists of successive strings of four consecutive bits distributed into two groups (in the case of a 16-QAM modulation):

the two most significant bits of the string are systematic bits in priority;

the two least significant bits of the string, which are more sensitive to transmission errors while using a 16-QAM modulation as previously discussed, are preferably parity check bits.

These two groups correspond to the MSBs and LSBs of the 16-QAM symbols as described previously. It is observed that the assignment of the coded bits to the MSB and LSB groups is performed as early as the bit collection part of the rate matching and HARQ module 40a.

Except in the specific case where the rate matching brings the overall coding rate of the current block up to the value ½, there are not exactly as many parity check bits as systematic bits. The bit collection unit 45a arranges the bits of its input block to satisfy the preferred assignment rule for any proportion of systematic and parity check bits in the input block.

For implementing the bit mapping technique, the bit collection unit 45a may for example use variables defined as follows:

a MSB pointer within the 4-bit strings (systematic_pointer, ranging from 0 to 3, initialized to 0);

a LSB pointer within 4-bit strings (parity_pointer, ranging from 0 to 3, initialized to 3);

a pointer to the 4-bit string being filled within the sequence g (symbol_pointer);

a local counter to count how many bits have already been written into a particular string of four bits (Nb_bit_in_Symb, initialized to 0).

In this example, the $3 \times N_c$ bit positions are successively scanned at the output z of the rate matching unit 43a, in the order S, $P_1$, $P_2$, S, $P_1$, $P_2$, S, $P_1$, $P_2$, etc. When a (non-punctured) systematic bit is read in z, it is written into position systematic_pointer within the 4-bit string being filled, and systematic_pointer is then incremented by one unit (systematic_pointer++). Nb_bit_in_Symb is incremented as well (Nb_bit_in_Symb++). When a (non-punctured) parity bit is read in z, it is written into position parity_pointer within the current 4-bit string, and parity_pointer is then decremented by one unit (parity_pointer--). Nb_bit_in_Symb is also incremented (Nb_bit_in_Symb++).

When the counter Nb_bit_in_Symb becomes equal to 4, it means that four bits have been written into the current 4-bit string. The pointers systematic_pointer and parity_pointer are reset to 0 and 3, respectively, and Nb_bit_in_Symb is reset to 0, while symbol_pointer is incremented to reflect the position within the sequence g of the next 4-bit string to be filled with bits from z.

When the scanned bit position is that of a bit punctured by the rate matching unit 43a, either systematic or parity check, nothing is done, except that the read pointer on the sequence z is incremented.

The above operation is summarized in the following pseudo-code, describing an iteration repeated until all bits in z have been scanned:

```
if (bit read in z is not to be punctured)
{
    if (bit read in z = parity bit)
    {
        Write bit in g at position symbol_pointer*4 + parity_pointer
        parity_pointer --
```

-continued

```
        Nb_bit_in_Symb ++
    }
    else if (bit read in z = systematic bit)
    {
        Write bit in g at position symbol~pointer*4 +
        systematic_pointer systematic_pointer ++
        Nb_bit_in_Symb ++
    }
}
if (Nb_bit_in_Symb == 4)
{
    systematic_pointer = 0
    parity_pointer = 3
    Nb_bit_in_Symb = 0
    symbol_pointer ++
}
```

It will be appreciated that various other bit mapping procedures may be used to achieve the above assignment rule, in the case of a variable rate puncturing and/or repetition.

When several physical channels (HS-PDSCH, "High Speed—Physical Downlink Shared Channels") are used, a physical segmentation is applied by a module 50a to the output sequence g of rate matching and HARQ module 40a (FIG. 3). Such segmentation distributes the bits blockwise among the different physical channels. The bit arrangement within the 4-bit strings is not modified by module 50a, the sequence g being simply split into p sub-sequences of consecutive strings if there are p HS-PDSCHs.

Afterwards, the (sub-)sequence pertaining to each HS-PDSCH is supplied to an interleaver 60a. A feature of the interleaver is that it maintains the bit group assignment established by the bit collection unit 45a: the MSBs at the input of the interleaver remain assigned to the MSB group at the output, and the LSBs remain assigned to the LSB group.

Therefore the systematic bits (S') remain in priority in the MSB positions of each four-bit string, while the parity check bits ($P'_1$, $P'_2$) remain preferably in the LSB positions. If a coding rate of ½ is used, resulting from the rate ⅓ turbocoder and rate matching, every systematic bit of the input sequence is a MSB after the interleaving, and every parity check bit is a LSB.

The interleaver used in step 60a can do different types of processing. One embodiment is to operate on a symbol basis, rather than on a bit basis. In other words, such interleaver carries out a permutation of the input 4-bit strings without changing the bit arrangement within each string. In particular, the interleaver may use the permutation defined for the second interleaver in the dedicated physical channels, disclosed in the above-mentioned specification TS 25.212, on a QAM symbol basis rather than on a bit basis.

Figure 5:
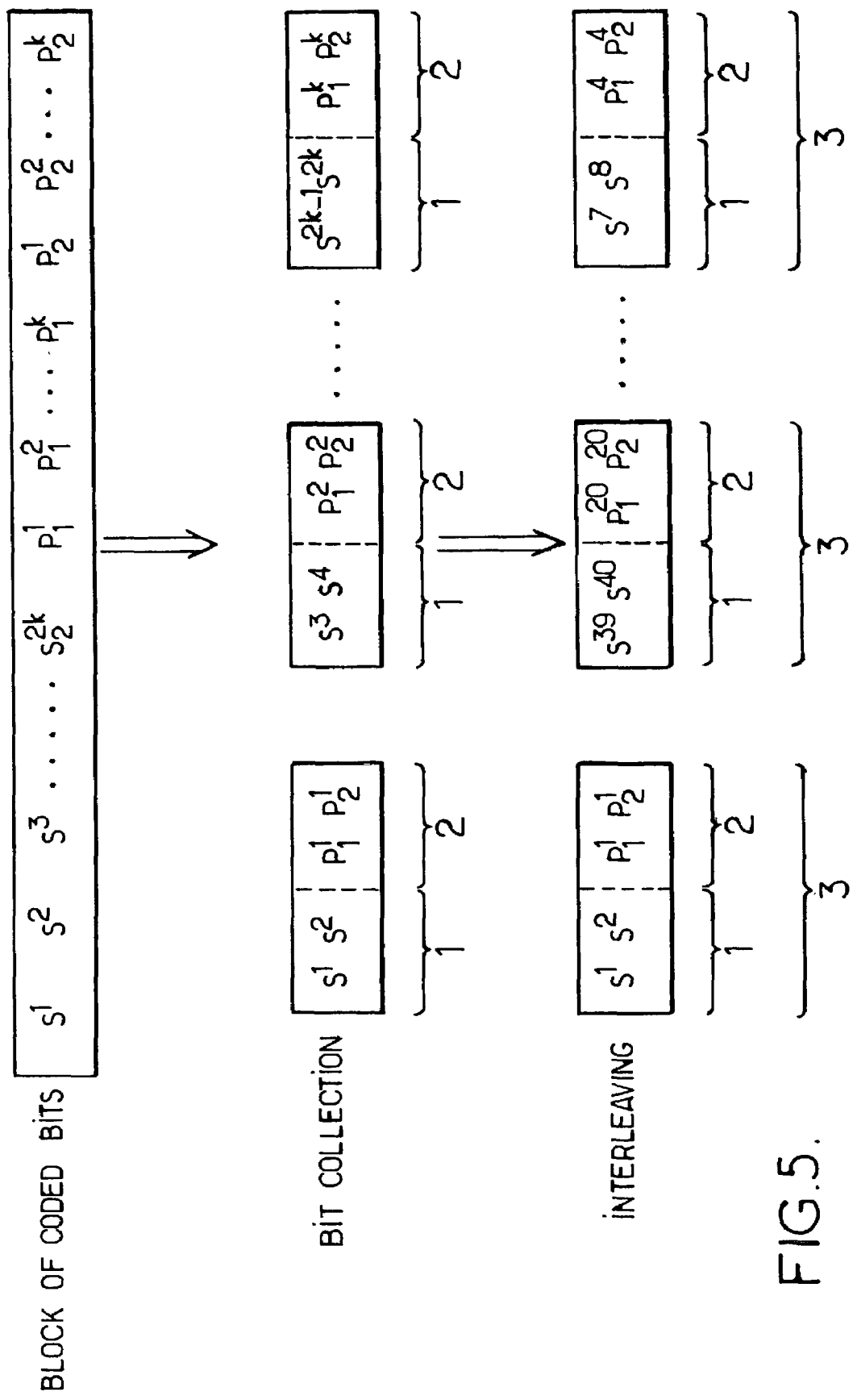
FIG. 5 illustrates an example of bits processing according to the invention.

FIG. 5 shows a non-limiting example of operations carried out according to the invention for one HS-DSCH transport block which has been coded with a coding rate of ½ after rate matching. The block in question contains 2 k systematic bits $S^i$, (i integer between 1 and 2 k) and 2 k parity check bits $P_1^j$ and $P_2^j$ (j integer between 1 and k), where k is an integer.

The bit collection unit 45a modifies the bit order so as to assign the systematic bits to the MSB group and the parity check bits to the LSB group. When the above pseudo-code is implemented, the resulting bits sequence is composed of n strings of four bits, where the $i^{th}$ string of the sequence g contains two systematic bits $S^{2i-1}$ and $S^{2i}$ as MSBs (1 in FIG. 5) and two parity check bits ($P_1^i$ and $P_2^i$) as LSBs (2). It can be noted that the numbers of systematic bits and of parity check bits are different when the puncturing rate varies, so that some of the 4-bit strings do not contain such a balanced distribution of systematic and parity check bits.

The sequence g is then interleaved. For the illustration, it is supposed here that there is only one HS-PDSCH. In FIG. 5, a symbol-based interleaving has been chosen, so that the 4-bit strings are moved with no internal modification. The structure of each string 3 is thus unchanged ($S^{2i-1}$, $S^{2i}$, $P_1^i$, $P_2^i$), the permutation being applied to the string index i. So, it can be observed in FIG. 5 that the assignment of the bits to the MSB and LSB groups 1, 2 achieved in the bit collection step is preserved after the interleaving.

It will be appreciated that other interleaving schemes can fulfill this requirement.

After the interleaver 60a, a physical channel mapping module 70a writes the contents of the sequence into one or more physical channels, as described for the other channels in the aforesaid specification TS 25.212. It maps the four-bit strings of the incoming sequence onto respective QAM symbols to provide a sequence of QAM symbols input to the following modulation and transmission stages (not shown).

After the construction of such physical channels, the symbol sequences are 16-QAM-modulated. If another modulation is considered, the previous method can also be used, but the advantage may not be as good as for a quadrature amplitude modulation like 16-QAM. In particular, it will be noted that the above-described transmission chain (FIG. 3) can also be used when QPSK modulation applies.

The advantage gained by using the invention when 16-QAM modulation is chosen, is to ensure the most important bits, e.g. systematic bits, will be most often placed in the most protected positions as explained before. Accordingly, the probability of transmission error after channel decoding is minimized.

From the receiver point of view, i.e. in the mobile station 15 according to FIG. 1 in an HSDPA context, operations are performed in an inverse way compared to the base station transmission chain shown in FIG. 3, in order to retrieve the initial information bits blocks transmitted by the base station 14.

Figure 6:
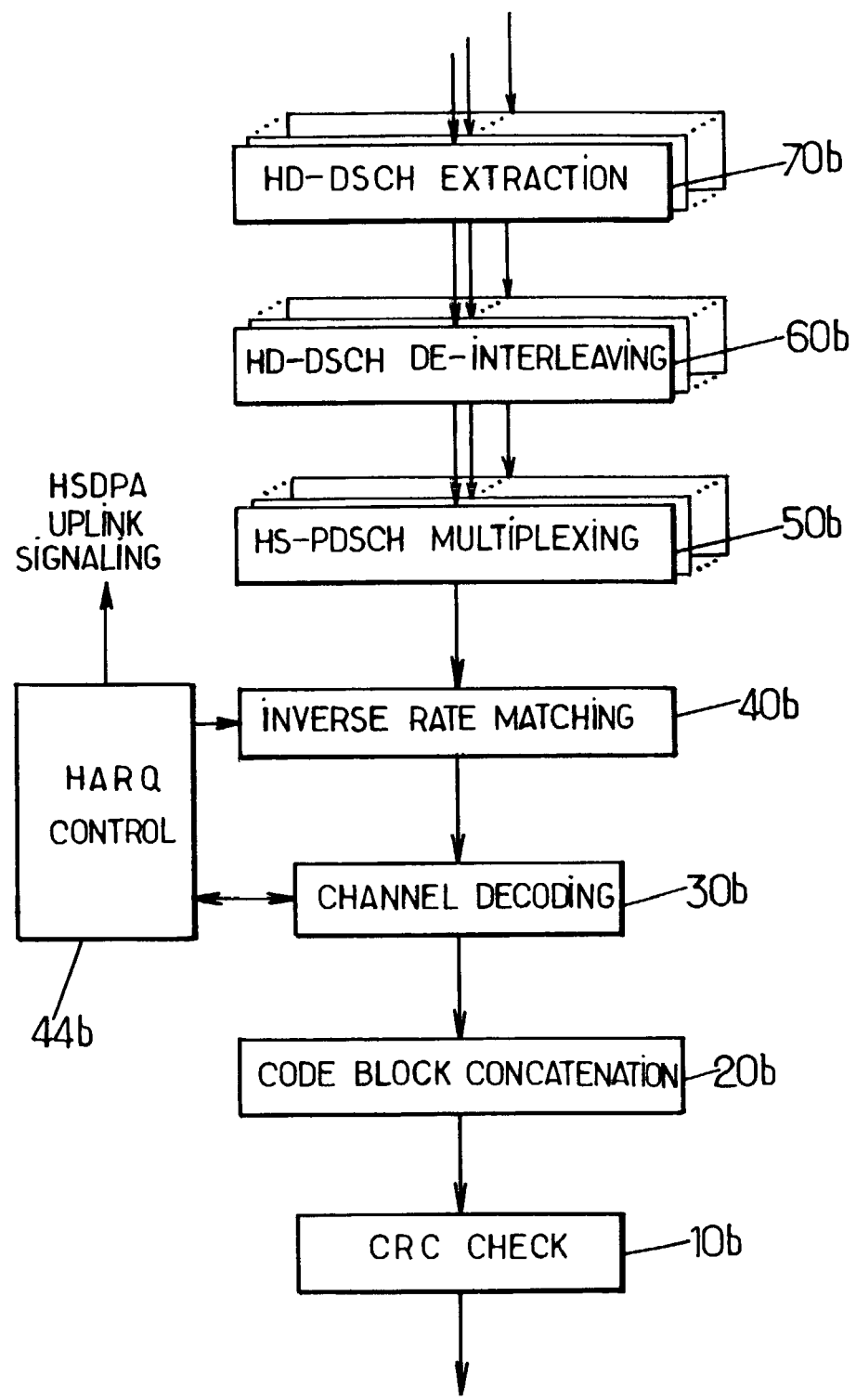
FIG. 6 is a block diagram of an exemplary reception chain implementing the invention.

After receiving a signal from the base station, the demodulator of the UE (not shown) conventionally estimates the 16-QAM symbols of each sequence received on a HS-PDSCH. Each symbol is composed of four bits, and, as explained previously, the two MSB have a lower probability of reception error than the two LSB because they are more easily discriminated by the demodulator. The mobile station then maps the estimated 16-QAM symbols onto a corresponding sequence of estimated bits (block 70b in FIG. 6). This can be performed like for the other channels as described in the aforesaid specification TS 25.212. The estimated bits are "softbits", i.e. numerical values between −Qmax and +Qmax with the sign representing the hard estimation of the binary value and the absolute value quantizing the likelihood of the estimation.

Then a de-interleaver 60b processes the resulting estimated bits sequence for the HS-PDSCH. The de-interleaver conventionally applies the inverse (string) permutation with respect to the permutation applied by the interleaver 60a at the transmitting end.

If several HS-PDSCHs are used, the multiplexing module 50b of the mobile station multiplexes the corresponding de-interleaved sequences to re-assemble estimates of the encoded HS-DSCH information, thus forming a received HS-DSCH block.

This HS-DSCH block is fed to an inverse rate matching module 43b which performs the dual operations of the rate matching unit 43a of FIG. 4. In the case of puncturing, it inserts zero softbits, i.e. estimated bits of lowest reliability, in the bit positions defined by the relevant puncturing pattern while the other bit positions are occupied by the bit estimates from the received HS-DSCH block, distributed inversely of the bit collection scheme explained previously. An input block of $3 \times N_c$ bit estimates is thus obtained for the following channel decoder 30b.

The channel decoder 30b performs iterative soft decoding of the input block based on the rate-$\frac{1}{3}$ turbocode, as is well known in the art. It informs the HARQ control module 44b whenever it detects that the current block cannot be correctly decoded. The module 44b sends HSDPA uplink signaling to its peer module 44a of the base station to point out the badly-received blocks which therefore have to be repeated. The control module 44b also selects the relevant puncturing or repetition pattern to be used by the inverse rate matching module 43b, based on the redundancy version index of the incoming block, and controls the decoder 30b accordingly to take advantage of IR.

If necessary, a concatenation module 20b re-assembles the blocks of $N_c \leq 5114$ (hard) bits output by the channel decoder 30b.

Finally, the integrity of the received block is checked by a module 10b by means of the CRC attached to the transport block. If the CRC reveals an error, the CRC check module 10b warns the HARQ control module 44b so that the base station will be informed accordingly.

While the invention has been disclosed in its particular application to the HSDPA functionality in a UMTS type of network, it will be appreciated that the disclosed method and apparatuses can readily be adapted to other kinds of transmission technology using QAM modulations or the like along with variable rate channel coding (particularly with punctured turbocodes) and interleaving techniques.

We claim:

1. A method of producing at least one sequence of modulation symbols for transmission, each modulation symbol consisting of a predefined number of bits, the method comprising the steps of:
   providing at least one block of coded information bits to be transmitted;
   arranging the coded information bits of said block to form at least one first sequence of bits in which each information bit is assigned to a respective one of at least two bit groups, including a first group of bits located in at least one first bit position within said predefined number of bits and a second group of bits located in at least one second bit position within said predefined number of bits and having a higher probability of transmission error than the bits of the first group;
   interleaving the bits of each first sequence to form a respective second sequence of bits while preserving the assignment of the information bits to said bit groups;
   mapping each second sequence of bits onto a respective sequence of modulation symbols; and
   transmitting the sequence of modulation symbols to a receiver.

2. A method as claimed in claim 1, wherein said block of coded information bits to be transmitted includes systematic bits and a variable proportion of parity check bits.

3. A method as claimed in claim 2, wherein the systematic bits are assigned in priority to the first group of bits.

4. A method as claimed in claim 1, wherein the modulation symbols are transmitted by quadrature amplitude modulation and the predefined number of bits per modulation symbol is n, including n/2 bits of the first group and n/2 bits of the second group, where n is an even integer.

5. A method as claimed in claim 4, wherein n=4, the modulation being 16-QAM.

6. A method as claimed in claim 1, wherein the step of interleaving the bits of a first sequence comprises permuting strings of n consecutive bits of said first sequence while preserving the bit ordering within each of said strings, where n denotes the predefined number of bits per modulation symbol, and wherein the step of mapping comprises mapping each of the strings of a second sequence of bits onto a respective modulation symbol.

7. A method as claimed in claim 1, further comprising the steps of:
   encoding a first block of information bits by applying an error correction code to provide a second block of coded information bits; and
   extracting bits of the second block to form said at least one block of coded information bits to be transmitted.

8. A method as claimed in claim 7, wherein the error correction code is a turbocode.

9. A method as claimed in claim 8, wherein the turbocode yields systematic bits that are assigned in priority to the first bit group, and parity check bits.

10. A method as claimed in claim 7, wherein the step of extracting comprises puncturing bits of the second block according to a puncturing pattern to form a block of coded information bits to be transmitted.

11. A method as claimed in claim 10, wherein the puncturing is performed at a variable rate.

12. A method as claimed in claim 10, further comprising the following steps in response to an indication of block reception failure:
   puncturing the second block according to another puncturing pattern to form another block of coded information bits to be transmitted;
   arranging the coded information bits of said other block to form at least one other first sequence of bits in which each coded information bit is assigned to a respective one of said bit groups;
   interleaving the bits of each other first sequence to form a respective other second sequence of bits while preserving the assignment of the information bits to said bit groups; and
   mapping each other second sequence of bits onto a respective sequence of modulation symbols for retransmission.

13. A method as claimed in claim 7, wherein the step of extracting comprises repeating bits of the second block according to a repetition pattern to form a block of coded information bits to be transmitted.

14. An apparatus for producing at least one sequence of modulation symbols for transmission, each modulation symbol consisting of a predefined number of bits, the apparatus comprising:
   means for providing at least one block of coded information bits to be transmitted;
   means for arranging the coded information bits of said block to form at least one first sequence of bits in which each information bit is assigned to a respective one of at least two bit groups, including a first group of bits located in at least one first bit position within said predefined number of bits and a second group of bits located in at least one second bit position within said predefined number of bits and having a higher probability of transmission error than the bits of the first group;
means for interleaving the bits of each first sequence to form a respective second sequence of bits while preserving the assignment of the information bits to said bit groups; and
means for mapping each second sequence of bits onto a respective sequence of modulation symbols.

15. An apparatus as claimed in claim 14, wherein said block of coded information bits to be transmitted includes systematic bits and a variable proportion of parity check bits.

16. An apparatus as claimed in claim 15, wherein the means for arranging the information bits are configured to assign in priority the systematic bits to the first bit group.

17. An apparatus as claimed in claim 14, wherein the modulation symbols are quadrature amplitude modulation symbols, and the predefined number of bits per modulation symbol is n, including n12 bits of the first group and n/2 bits of the second group, where n is an even integer.

18. An apparatus as claimed in claim 17, wherein n=4, the modulation being 16-QAM.

19. An apparatus as claimed in claim 14, wherein the means for interleaving the bits of a first sequence are configured to permute strings of n consecutive bits of said first sequence while preserving the bit ordering within each of said strings, where n denotes the predefined number of bits per modulation symbol, and wherein the means for mapping are configured to map each of the strings of a second sequence of bits onto a respective modulation symbol.

20. An apparatus as claimed in claim 14, wherein the means for providing at least one block of coded information bits to be transmitted comprise:
means for encoding a first block of information bits by applying an error correction code to provide a second block of coded information bits; and
means for extracting bits of the second block to form said at least one block of coded information bits to be transmitted.

21. An apparatus as claimed in claim 20, wherein the error correction code is a turbocode.

22. An apparatus as claimed in claim 21, wherein the turbocode yields systematic bits that are assigned in priority to the first bit group, and parity check bits.

23. An apparatus as claimed in claim 20, wherein the means for extracting comprises means for puncturing bits of the second block according to a puncturing pattern to form a block of coded information bits to be transmitted.

24. An apparatus as claimed in claim 23, wherein the puncturing means have a variable rate.

25. An apparatus as claimed in claim 23, further comprising:
means responsive to an indication of block reception failure for puncturing the second block according to another puncturing pattern to form another block of coded information bits to be transmitted, whereby said other block is input to said means for arranging, interleaving and mapping to produce at least one other sequence of modulation symbols for retransmission.

26. An apparatus as claimed in claim 20, wherein the means for extracting comprises means for repeating bits of the second block according to a repetition pattern to form a block of coded information bits to be transmitted.

27. An apparatus comprising:
means for receiving along a communication channel at least one sequence of estimated modulation symbols, each modulation symbol consisting of a predefined number of bits, wherein the at least one sequence of modulation symbols defines at least two bit groups, including a first group of estimated bits located in at least one first bit position within the symbols and a second group of estimated bits located in at least one second bit position within the symbols and having a higher probability of reception error than the estimated bits of the first group;
means for mapping each sequence of estimated modulation symbols onto a respective first sequence of estimated bits;
means for de-interleaving the estimated bits of each first sequence to form a respective second sequence of bits while preserving the assignment of the estimated bits to said bit groups;
means for arranging the estimated bits of the at least one second sequence into a block of estimated bits; and
means for evaluating a block of information bits by means of the block of estimated bits.

28. An apparatus as claimed in claim 27, wherein the modulation symbols are quadrature amplitude modulation symbols, and the predefined number of bits per modulation symbol is n, including n/2 bits of the first group and n/2 bits of the second group, where n is an even integer.

29. An apparatus as claimed in claim 28, wherein n=4, the modulation being 16-QAM.

30. An apparatus as claimed in claim 27, wherein the means for de-interleaving are configured to permute strings of n consecutive estimated bits of each first sequence while preserving the bit ordering within each of said strings, where n denotes the predefined number of bits per modulation symbol.

31. An apparatus as claimed in claim 27, wherein the means for evaluating the block of information bits comprise a channel decoder to correct transmission errors.

32. An apparatus as claimed in claim 31, wherein the channel decoder is arranged to perform iterative decoding based on a turbocode.

33. An apparatus as claimed in claim 32, wherein the turbocode yields systematic bits that are assigned in priority to the first bit group, and parity check bits.

34. An apparatus as claimed in claim 31, wherein the means for evaluating the block of information bits further comprise means for constructing an input block for the channel decoder, said input block having estimated bits of lowest reliability in bit positions defined by a puncturing pattern, and estimated bits from said block of estimated bits out of the positions defined by the puncthring pattern.

35. An apparatus as claimed in claim 34, wherein the puncturing pattern is variable.

* * * * *

UNITED STATES PATENT AND TRADEMARK OFFICE
CERTIFICATE OF CORRECTION

| | |
|---|---|
| PATENT NO. | : 7,272,191 B2 |
| APPLICATION NO. | : 10/180853 |
| DATED | : September 18, 2007 |
| INVENTOR(S) | : Arnauld Taffin and Bastien Massie |

It is certified that error appears in the above-identified patent and that said Letters Patent is hereby corrected as shown below:

Column 12:
Line 56, "punchthring" should be --puncturing--.

Signed and Sealed this

Eleventh Day of December, 2007

JON W. DUDAS
*Director of the United States Patent and Trademark Office*